United States Patent
Kim et al.

(10) Patent No.: US 7,049,233 B2
(45) Date of Patent: May 23, 2006

(54) APPARATUS AND METHOD FOR MANUFACTURING THIN FILM ELECTRODE OF HYDROUS RUTHENIUM OXIDE

(75) Inventors: Kwang Bum Kim, Goyang-Si (KR); Il Hwan Kim, Seoul (KR); Kyung Wan Nam, Seoul (KR)

(73) Assignee: Yomsei University, Seoul (KR)

( * ) Notice: Subject to any disclaimer, the term of this patent is extended or adjusted under 35 U.S.C. 154(b) by 243 days.

(21) Appl. No.: 10/398,761

(22) PCT Filed: Jul. 26, 2001

(86) PCT No.: PCT/KR01/01269

§ 371 (c)(1),
(2), (4) Date: Apr. 10, 2003

(87) PCT Pub. No.: WO02/35635

PCT Pub. Date: May 2, 2002

(65) Prior Publication Data

US 2004/0013799 A1    Jan. 22, 2004

(30) Foreign Application Priority Data

Oct. 25, 2000 (KR) ........................ 10-2000-0062928

(51) Int. Cl.
*H01L 21/44* (2006.01)
*B05B 5/025* (2006.01)

(52) U.S. Cl. ........................ 438/686; 427/483
(58) Field of Classification Search ............... 438/686; 427/248.1, 483

See application file for complete search history.

(56) References Cited

U.S. PATENT DOCUMENTS

| | | | | |
|---|---|---|---|---|
| 4,604,294 A | * | 8/1986 | Tanaka et al. | 427/509 |
| 5,182,165 A | * | 1/1993 | Clough et al. | 442/127 |
| 5,494,701 A | * | 2/1996 | Clough et al. | 427/126.3 |
| 5,600,535 A | * | 2/1997 | Jow et al. | 361/503 |
| 5,756,207 A | * | 5/1998 | Clough et al. | 428/375 |
| 5,894,403 A | * | 4/1999 | Shah et al. | 361/528 |
| 6,316,064 B1 | * | 11/2001 | Onozawa et al. | 427/585 |
| 6,649,211 B1 | * | 11/2003 | Lyons et al. | 427/126.5 |
| 2001/0024700 A1 | * | 9/2001 | Shah et al. | 427/600 |

* cited by examiner

*Primary Examiner*—Matthew Smith
*Assistant Examiner*—Lex H. Malsawma
(74) *Attorney, Agent, or Firm*—GWiPS

(57) ABSTRACT

An apparatus and method are provided for manufacturing an electrode of hydrous ruthenium oxide thin film, consisting of an injector for spraying a precursor solution, a substrate for depositing the precursor solution, a base for supporting the substrate and a halogen lamp for heating the substrate, a DC power supply connected to the injector and base, a space adjuster for adjusting the spraying space between the injector and the base, and temperature controller for controlling the temperature of the base. Because of the strong electric field, the sprayed ruthenium precursor solution atomizes the nano-sized very fine particles. Therefore, the atomized particles are deposited on the substrate to form a very fine porous thin film under the influence of electrically charged molecular actions without the influence of gravitation force. The ruthenium oxide electrode formed the fine porous thin film has excellent property of super capacitor, composite electrode of ruthenium oxide and activated carbon.

2 Claims, 6 Drawing Sheets

APPARATUS AND METHOD FOR MANUFACTURING THIN FILM ELECTRODE OF HYDROUS RUTHENIUM OXIDE

BACKGROUND OF THE INVENTION

1. Field of the Invention

The present invention relates to an apparatus and a method for preparing a thin film electrode of hydrous ruthenium oxide. More specifically, the present invention relates to an apparatus and a method for preparing an electrode of hydrous ruthenium oxide thin film by spraying ruthenium precursor solution on a heated substrate under strong electric field, thus forming a porous thin film electrode of very fine size.

2. Description of the Related Art

Generally, a high performance portable power supply has been used as a main component of end-products essentially used in all portable information communication equipment, electronic apparatus, electric automobile and so on. Next generation energy storage systems, which have been recently developed, utilize electrochemical principles and are exemplified by a Li based secondary cell and an electrochemical capacitor.

In the aspect of energy amount, the secondary cell is advantageous because it is capable of accumulating dense energy per unit weight or unit volume. However, the secondary cells are disadvantageous in light of energy amount (power density), applicable per time, period of use, and charging time. Furthermore, the electrochemical capacitor has energy density smaller than the secondary cell, and is more advantageous in terms of duration of use, charging time and power density, compared to the secondary cell. Therefore, in the case of electrochemical capacitor, research for improving energy density has been performed with vigor. The electrochemical capacitor with ultrahigh capacitance applied the electrochemical principle is classified into an electrical double layer capacitor (EDLC) using a principle of electrical double layer, and a super capacitor showing ultrahigh capacitance which has maximal capacitance 10 fold larger than that of EDLC by pseudocapacitance generated from electrochemical faradic reaction. In the case of the EDLC, activated carbon/fiber is useful as electrode material of the capacitor, and thus an electric charge of high density is accumulated in the electrical double layer. As the electrode material contained in the super capacitor, the metal oxides can be used.

A super capacitor with high capacitance and high power density can either be used alone or in combination with a secondary cell in the fields of power supplies for electro mobile, portable mobile communication equipment, memory back-up of computer, military and aeronautic apparatus, and micro medical equipment. EDLC that utilizes synthetic carbon material as electrode has been commercially available since the early 1980s in Japan, thus their practical developments have reached their technical limits. Regular research for metal oxide based electrode material utilizing super capacitor has only been embarked on within these past 4 to 5 years by both the United States and Japan. However, the super capacitors have some obvious setbacks, the setbacks are manifested in the form of expensive electrode active materials and difficult preparation process. Therefore, they can only be used for special purposes, such as military affairs. Its commercial use has been delayed.

On the other hand, the electrode materials developed for super capacitor until now comprise $RuO_2$, $IrO_2$, NiO, CoOx, $MnO_2$, $WO_3$ and the like. Of these materials, $RuO_2$ and $IrO_2$ show the most excellent electrochemical properties, while the other materials show poor electrochemical properties. Most researches have placed emphasis on these two materials. In particular, ruthenium oxide with very excellent performance has been widely studied as metal oxide electrode for super capacitor applications.

In general, ruthenium oxide is mainly divided into two types of the anhydrous type and the hydrous type.

To produce an electrode of ruthenium oxide for super capacitor, an anhydrous ruthenium oxide electrode is mainly prepared by pyrolysis process and a hydrous ruthenium oxide electrode is mainly prepared by sol-gel process. During the pyrolysis process, $RuCl_3.xH_2O$ dissolved in distilled water or alcohol is used as a precursor solution, which is then pyrolyzed on a conductive metal substrate at high temperature 350–500° C. As a result of the process, tantalum or titanium is used as substrate material, particularly; titanium is preferred because of the excellent adhesion between titanium and $RuO_2$. For the sol-gel process, a precursor solution is $RuCl_3.xH_2O$ in distilled water, similar to the pyrolysis process aqueous NaOH solution is slowly added to maintain the solution at about 7. $Ru(OH)_3$ is thermodynamically stabilized and precipitated in the solution in black powder form. The precipitated ruthenium powder is filtered with about 8 μm-caliber filter and then washed. The washing is performed by repeating the procedure five times, that is, the procedure of distilled water poured in to a powder contained vessel at a suitable volume, stirred for approximately thirty minutes and then filtered. The final product obtained is $RuO_2.2H_2O$, which is then thermally treated at appropriate temperature for 17 hours, thereby yielding hydrous ruthenium oxide powder. In order to employ the powder as a practical electrode, the powder is mixed with Teflon binder in a mass ratio of 5% and rolled, to prepare an electrode in a thin film form of 100–200 μm. Although the electrode of hydrous ruthenium oxide has high capacitance of 720 F/g, it has a disadvantage of poor discharge/charge and low power properties. To alleviate these disadvantages, powders prepared by sol-gel process are mechanically mixed with approximately 20% activated carbon and Teflon binder, to yield a composite electrode, which has specific capacitance of 650 F/g lower than that of hydrous ruthenium oxide electrode, at slow discharge rate, but maintaining a specific capacitance of about 600 F/g at fast discharge rate. However, sol-gel process has disadvantages because the process is complicated with multiple steps and long periods of time required for preparation.

SUMMARY OF THE INVENTION

Bearing in mind problems encountered in the prior arts, an objective of the present invention is to provide a method for manufacturing a thin film electrode of hydrous ruthenium oxide with excellent performance through a simplified electrostatic aerosol spray pyrolysis (EASP) process requiring short period of time, compared to a complicated sol-gel process requiring long periods of time.

Another objective of the present invention to provide an apparatus for manufacturing a thin film electrode of hydrous ruthenium oxide.

In accordance with an embodiment of the present invention, an apparatus is provided for manufacturing a thin film electrode of hydrous ruthenium oxide, comprising: a injector for introducing a precursor solution and spraying the precursor solution; a substrate for having the precursor solution sprayed thereon; a substrate-supporting base for supporting the substrate and including a halogen lamp therein for heating the substrate; a direct current power supply connected to the substrate-supporting base and the injector; a distance adjuster for adjusting the distance between the substrate-supporting base and the injector; and a temperature controller for controlling the substrate-supporting base, in which the injector comprises an electronic flow regulator for accurately controlling a spraying amount by regulating a injecting speed of the injector, the distance adjuster maintaining the distance between the injector and the substrate-supporting base at a length of 0.5–10 cm, and the temperature controller evaporating solvent in the precursor solution, while maintaining pyrolyzable temperature of the precursor solution, thus forming an oxide or a oxide precursor.

According to another embodiment of the present invention, a method for manufacturing a thin film electrode of ruthenium oxide is provided. The method comprises the steps of: preparing a precursor solution, $RuCl_3 \cdot xH_2O$ in ethanol; introducing the precursor solution into the injector; heating a substrate by use of a halogen lamp; connecting a substrate-supporting base and the injector through a direct current power supply; spraying the precursor solution on the heated substrate; and thermally treating an electrode deposited on the substrate.

BRIEF DESCRIPTION OF THE DRAWINGS

The above mentioned invention, along with the objectives, features and advantages will be more clearly understood from the following detailed description made in conjunction with the accompanying drawings, in which.

DETAILED DESCRIPTION OF THE PREFERRED EMBODIMENT

Figure 1:
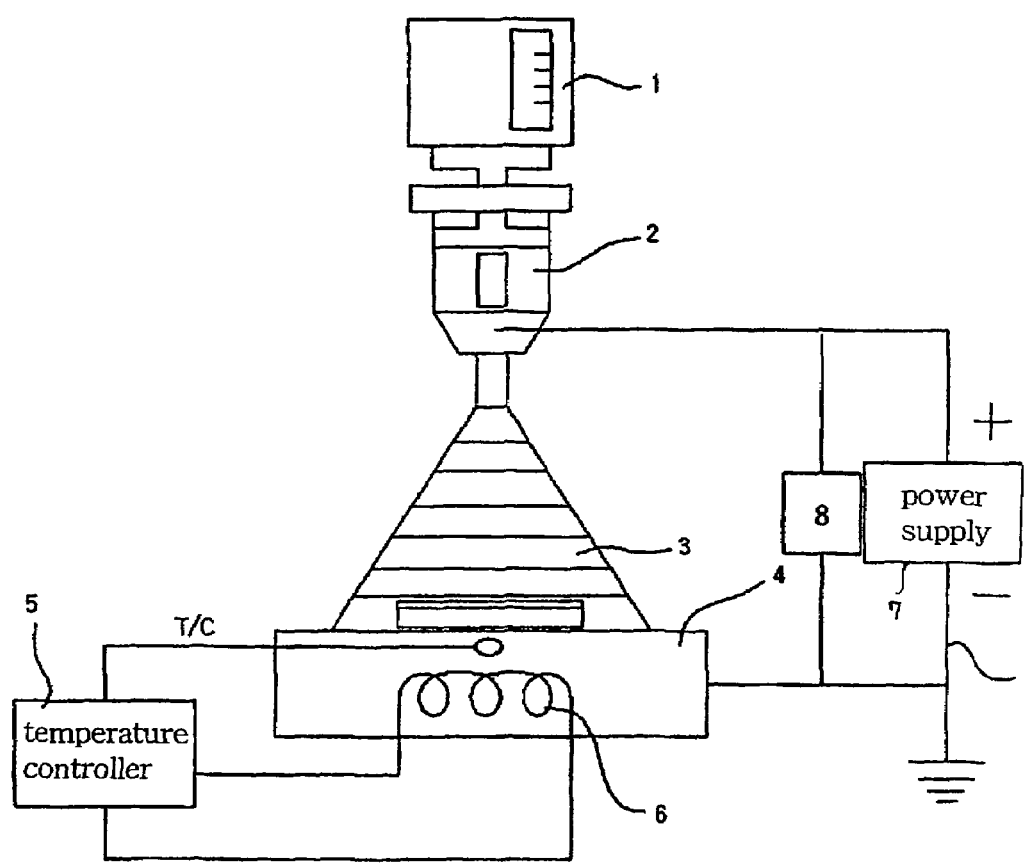
FIG. 1 is a schematic block diagram showing an EASP apparatus according to the present invention.

With reference to FIG. 1, it shows an electronic aerosol spray pyrolysis (EASP) apparatus used in the present invention. As can be seen in this figure, the EASP apparatus comprises an electronic flow regulator 1, an injection 2, a supporting base 4, a temperature controller 5, a halogen lamp 6, a high-voltage direct current power supply 7 and a distance adjuster 8. The electronic flow regulator 1 is capable to regulate the speed of piston for accurately controlling the spraying amount. The injector 2 is attached underneath of the electronic flow regulator 1. A needle of the injector 2 is electrically connected to a stainless steel substrate-supporting base 4 through a high-voltage direct current power supply 7 located between the injector 2 and the supporting base 4 to form a strong electric field. supporting base 4. For maintaining the constant temperature of the supporting base 4 which is heated by the halogen lamp 6, a temperature controller 5 is connected to the halogen lamp 6.

Particularly, the halogen lamp 6 as an exothermic source has designed to miniaturize the stainless steel substrate-supporting base. When the supporting base is heated by such lamp, heat transfer to the upper parts is minimized and thus aerosol spray can be stably formed by strong electric field.

The injector 2, which is connected to the electronic flow regulator 1, can control the flow of the solution sprayed from the injector 2 within tolerance of 0.01 ml/h.

A distance adjuster 8 can maintain the distance between the injector 2 and the supporting base 4 at a length of 0.5–10 cm.

The temperature controller 5 can evaporate solvent in a precursor solution, and also maintain pyrolyzable temperature of the precursor solution.

Figure 2A:
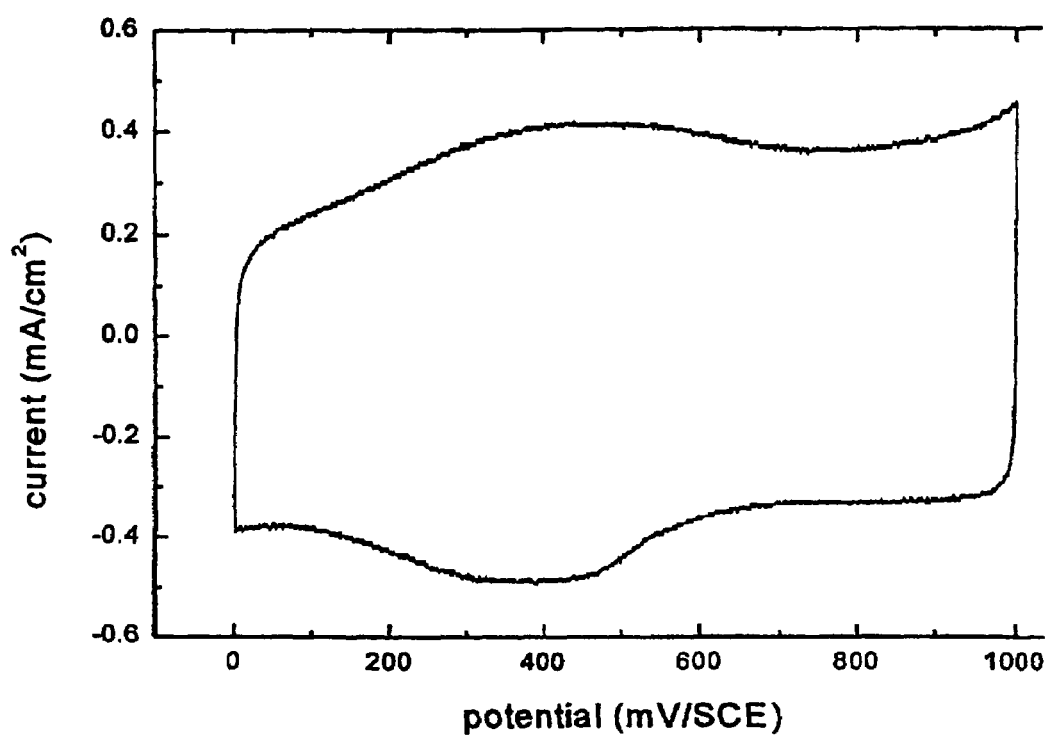
FIGS. 2a to 2c are voltamograms showing electrochemical properties of a thin film electrode of hydrous ruthenium oxide according to the present invention, obtained by cyclic voltammetry (a) at scan rate of 2 mV/sec in 0.5 M $H_2SO_4$ solution (b), at scan rate of 20 mV/sec in 0.5 M $H_2SO_4$ solution, and (c) at scan rate of 50 mV/sec in 0.5 M $H_2SO_4$ solution.
Figure 2B:
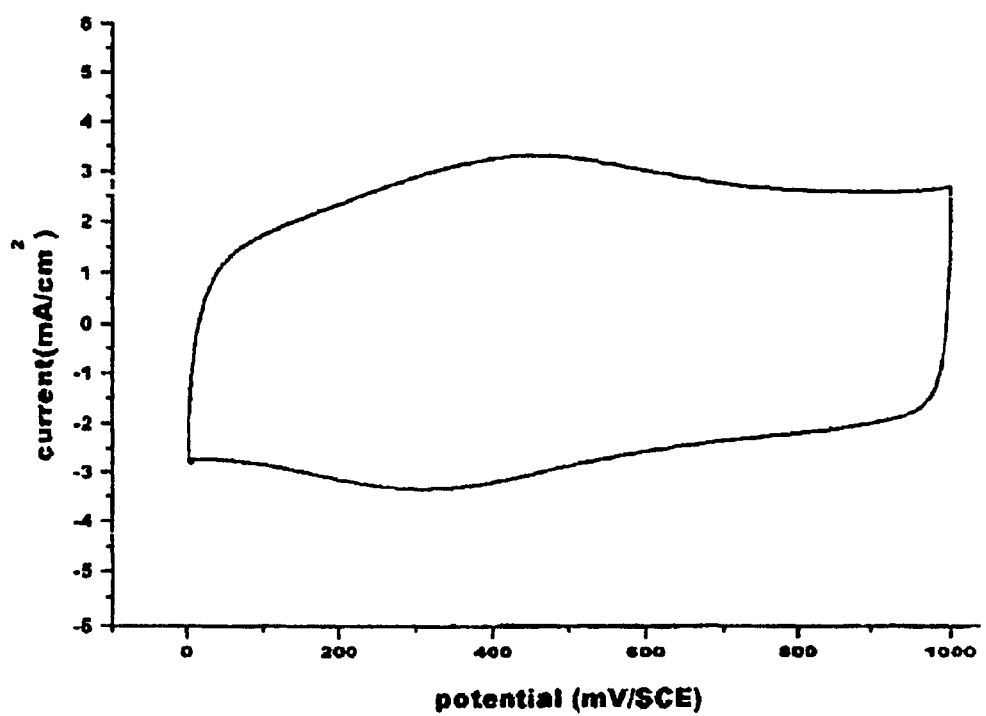
Figure 2C:
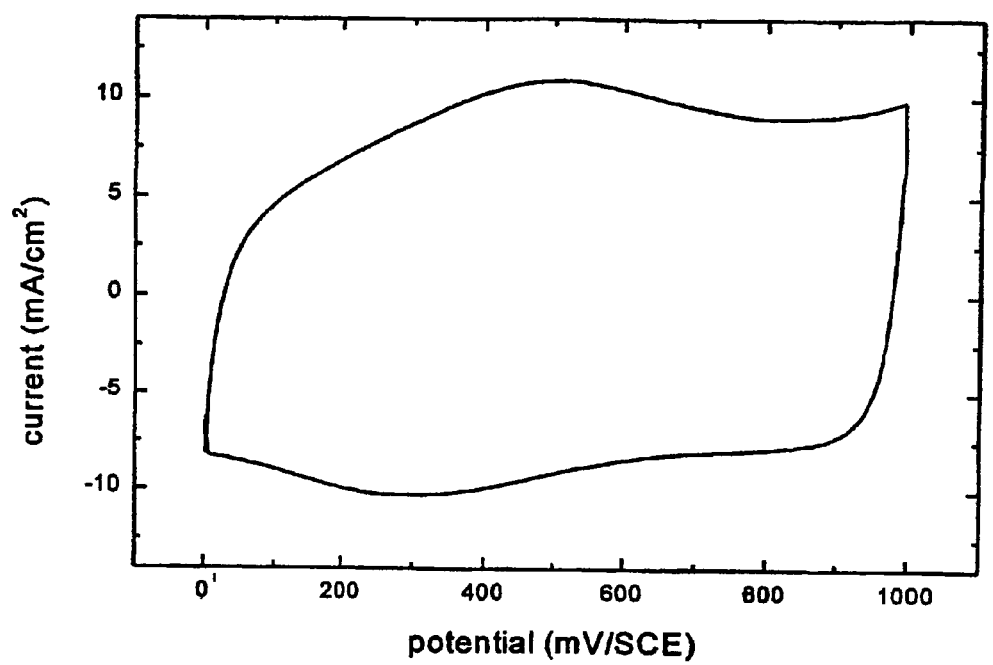

As shown in FIGS. 2a to 2c the graphs illustrate the electrochemical properties of the thin film electrode of hydrous ruthenium oxide according to the present invention. These graphs have characteristics of hysterisis curves, in which the electrode charges a predetermined capacitance and then discharges until all predetermined capacitance is consumed while maintaining constant current. In this regard, when the voltage is increased from 0 to 1000 mV, the current is maintained at 3 mA. On the other hand, when the voltage is decreased from 1000 to 0 mV, the current is maintained at −3 mA. An angulation in current and voltage relationship, which maintains a constant current according to constant change of voltage, is a unique electrochemical property of theoretical electrochemical capacitor. FIGS. 2a to 2c illustrate the relationships of current and potential when scan rates are 2 mV/sec, 20 mV/sec and 50 mV/sec.

Figure 3A:
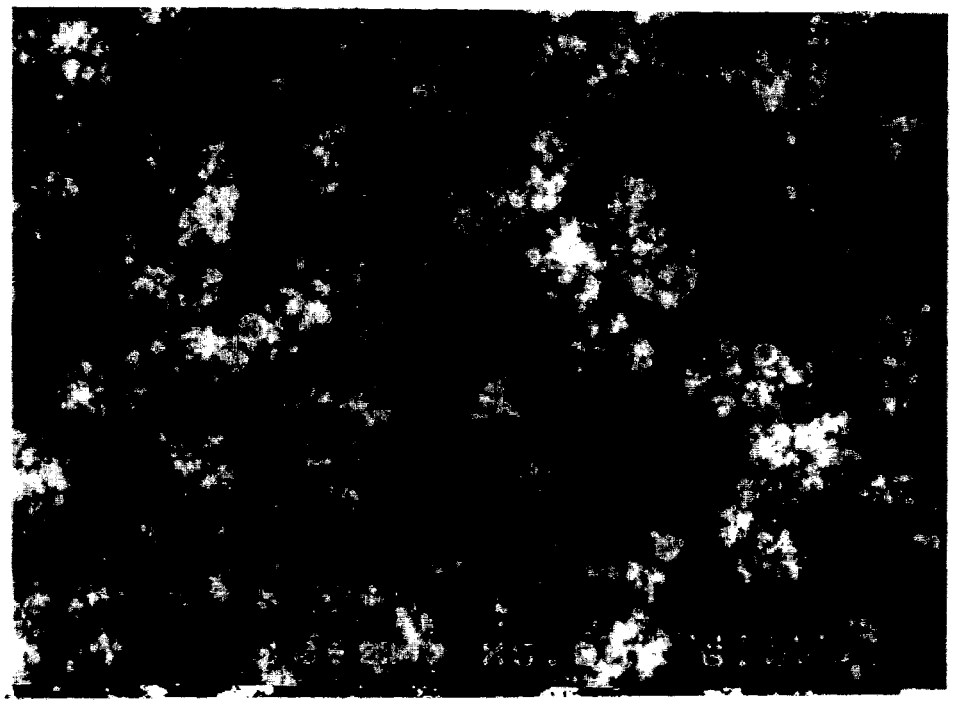
FIGS. 3a and 3b are microphotographs taken by a scanning electron microscope (SEM) for observing surface shape of the electrode at 5000 and 30000 magnifications, respectively.
Figure 3B:

Turning now to FIGS. 3a and 3b, they are showing the microphotographs of 5000 and 30000 magnifications, respectively, measured by use of a SEM, for observing surface shape of the electrode.

In order to measure electrochemical properties of the thin film electrode of hydrous ruthenium oxide according to the present invention, cyclic voltammetry (CV) is carried out in 10 cycles or more, using 0.5 M $H_2SO_4$ solution at scan rates of 2 mV/sec, 20 mV/sec and 50 mV/sec. The surface shapes of the same test pieces were observed by a SEM at 5000 and 30000 magnifications. As the CV observed, the result shows that the scan rate is 20 mV/sec, a level of specific capacitance is found to be 650 F/g. Even though the scan rate is increased to 50 mV/sec or higher, the specific capacitance is maintained similarly to the cases of 2 mV/sec and 20 mV/sec, in the level of high specific capacitance. The result of CV also show the property of the capacitor illustrating angulation. Additionally, as the SEM measurement result, it can be seen that the surface of the electrode is composed of a porous structure comprising very fine particles of nanometer sizes.

In a preferred example of the present invention, a method for manufacturing a thin film electrode of hydrous ruthenium oxide through the EASP process largely comprises the following 5 steps.

In preparing a precursor solution as the first step, the precursor solution useful in EASP process is $RuCl_3 \cdot xH_2O$ in ethanol, in which a heterogeneous solvent may be mixed with ethanol. By mixing the heterogeneous solvent, boiling points of the solution which are directly related to surface shape of the electrode can be increased or decreased. Such that the thin film electrode with the three-dimensional porous structure can be fabricated. As such, concentration of the solution ranges 0.001 M to 0.5 M.

Providing the substrate as a second step, electrode substrate usable in the EASP process uses Pt foil and Pt-deposited silicon wafer, including titanium and tantalum. Pt-deposited silicon wafer is prepared by thinly depositing $TiO_2$ oxidized at high temperature on silicon wafer to improve adhesion between Pt and silicon wafer, depositing Pt thereon, and washing the surface of the substrate with acetone and then ethanol, to prepare an electrode by the EASP process. The precursor solution is pyrolyzed on the substrate to form ruthenium oxide. So, the substrate-placed supporting base is heated, thereby maintaining the necessary temperature. In addition to the process, the temperature of the supporting base is controlled by lighting the halogen lamp mounted therein. For practical EASP process, the temperature is maintained at 50–400° C., which is relatively lower than that of the pyrolysis process.

Forming the stable spray as a third step, the high-voltage direct current power supply is connected between the substrate and the injector, thus forming a strong electric field.

Spraying the precursor solution as a fourth step, the prepared precursor solution is sprayed by use of the injector connected to the flow regulator. The precursor solution is introduced into the injector, and the piston within the injector is pushed to a suitable flow velocity capable of spraying the solution, thereby beginning the spraying of the solution. A practical flow velocity ranges from 0.1 to 10 ml/h. As such, because the needle of the injector is electrically connected to the stainless steel substrate-supporting base, when a strong electric field of 2 kV or higher is applied to the high-voltage direct current power supply, a tip of the needle is electrified to become a positive pole (+), and the substrate to become a negative pole (−). The precursor solution is electrified to (+) in the needle of the injector, and thus converted into aerosol caused by inequality of surface tension and electrical repulsive force. The newly formed aerosol is strongly affected by repulsive force of the same (+) pole, and hence instantly sprayed in a very fine droplet form. Simultaneously, strong attractive force corresponding to 2 kV or higher affects the substrate electrified as (−) pole, so spraying the aerosol at a fast rate to the substrate. Meanwhile, the aerosol attracted by strong attractive force reaches the substrate maintained at boiling points or higher of ethanol, ethanol is evaporated and very fine particles of nano sizes are deposited on the substrate and pyrolyzed at the same time, to form a porous $RuO_2 \cdot xH_2O$ thin film.

Thermally treating the electrode as a fifth step, the deposited electrode after completion of the spraying functions as an original $RuO_2 \cdot xH_2O$ thin film electrode by a thermally activated procedure. This is referred to as a thermal treatment process, which is essentially required for all electrodes of metal oxides. In the case of ruthenium oxide electrode manufactured by EASP process, a desired electrode is obtained by thermal treatment which is carried out at about 100–600° C. for about 2–24 hours under gas atmosphere including oxygen.

In the manufacture of hydrous ruthenium oxide electrode using the EASP apparatus, the aerosol is sprayed to the substrate not by gravity but by attractive force of the applied electric field. Hence, EASP apparatus can be positioned horizontally or perpendicularly, or at optional gradient, versus the apparatus-placed surface.

The electrode of ruthenium oxide thin film for super capacitor by the EASP process according to the present invention has high specific capacitance at fast scan rates in CV measurement for assaying capacitance of the electrode. In addition, the present electrode shows the angulation to be presented when a relationship of current and voltage in a capacitor is ideal, so that a super capacitor maintaining high specific capacitance upon practical fast discharge/charge can be fabricated.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for manufacturing a thin film electrode of ruthenium oxide comprises the steps of:
    preparing a precursor solution that is a heterogeneous solvent (RuC13·x H2O) mixed is ethanol,
    introducing said precursor solution into an injector (2) for spraying process,
    heating a substrate by a halogen lamp (6) for maintaining a temperature of 50–400° C. to process an electronic aerosol spray pyrolysis (EASP),
    forming a strong electrical field between a substrate-supporting base and said injector to generate electrically charged nano-size of very fine particles by connecting said substrate-supporting base and said injector (2) through a direct current power supply,
    spraying said precursor solution on said heated substrate to deposit said nano-sized very fine partices by influence of electrically charged particles actions; and
    treating said electrode deposited substrate for pyrolyzing about 100–600° C., about 2 to 24 hours under oxygen included gas atmosphere.

2. The method as claimed in claim 1, wherein said heterogeneous solvent mixed in ethanol has a property of increasing or decreasing boiling point of said precursor solution for producing a very fine porous thin film electrode formed three-dimensional regularity through the electrically charged particle reactions.

* * * * *